(12) United States Patent
Okada et al.

(10) Patent No.: US 6,807,808 B2
(45) Date of Patent: Oct. 26, 2004

(54) TORQUE CONVERTER

(75) Inventors: Katsuhiko Okada, Shizuoka (JP); Toshiaki Noda, Kanagawa (JP); Keichi Tatewaki, Shizuoka (JP)

(73) Assignee: Jatco Ltd., Fuji (JP)

( * ) Notice: Subject to any disclaimer, the term of this patent is extended or adjusted under 35 U.S.C. 154(b) by 74 days.

(21) Appl. No.: 10/251,831

(22) Filed: Sep. 23, 2002

(65) Prior Publication Data
US 2003/0061810 A1 Apr. 3, 2003

(30) Foreign Application Priority Data
Sep. 28, 2001 (JP) ....................................... 2001-303913

(51) Int. Cl.[7] .............................................. F16D 33/20
(52) U.S. Cl. .......................................... 60/361; 60/364
(58) Field of Search .......................... 60/361, 364, 365, 60/330; 416/180, 197 C

(56) References Cited

U.S. PATENT DOCUMENTS

| | | | | |
|---|---|---|---|---|
| 4,186,557 A | * | 2/1980 | Arai et al. ..................... | 60/361 |
| 4,191,015 A | * | 3/1980 | Komatsu et al. .............. | 60/361 |
| 4,624,105 A | * | 11/1986 | Nishimura et al. ........... | 60/361 |
| 4,783,960 A | * | 11/1988 | Kubo et al. .................... | 60/361 |
| 4,866,935 A | * | 9/1989 | Hayabuchi et al. ............ | 60/361 |
| 5,152,139 A | * | 10/1992 | Becraft .......................... | 60/361 |
| 5,241,820 A | * | 9/1993 | Fukunaga et al. ............. | 60/361 |
| 6,447,246 B1 | * | 9/2002 | Abe et al. ..................... | 415/187 |

FOREIGN PATENT DOCUMENTS

EP   1099879 A2   5/2001

* cited by examiner

*Primary Examiner*—Thomas E. Lazo
(74) *Attorney, Agent, or Firm*—Foley & Lardner LLP

(57) ABSTRACT

In a torque converter comprised of three major rotating elements, namely a pump impeller, a turbine runner to which a driving power is transmitted through a working fluid from the pump impeller, and a stator disposed between the pump impeller and the turbine runner, a flattening ratio L/D of a sum L of an pump-impeller axial length and a turbine-runner axial length to a torque-converter nominal diameter D is set to be less than or equal to 0.21. In order to balance contradictory requirements, namely reduced curvature loss, i.e., enhanced converter efficiency, proper rate-of-change in working-fluid flow passage area, and proper breakaway of working fluid from each turbine blade, a ratio r/R of a radius of curvature r of a turbine-core outer peripheral curved surface to a radius of curvature R of a turbine-shell outer peripheral curved surface being set to satisfy a predetermined inequality $0.3 \leq r/R \leq 0.5$.

10 Claims, 3 Drawing Sheets

TORQUE CONVERTER

TECHNICAL FIELD

The present invention relates to a torque converter into which a driving power is transferred from a driving power source such as an engine, and specifically to technologies for providing a flattened torque converter while enhancing operating characteristics of the torque converter.

BACKGROUND ART

European Patent Application No. EP 1 099 879 (hereinafter is referred to as "EP1099879" and corresponding to Japanese Patent Provisional Publication No. 2001-141026) discloses a flattened torque converter that a ratio 2L/H of the sum 2L of an axial length of a pump impeller (a driving torus) and an axial length of a turbine runner (a driven torus) to the difference H (=R−r) between a torus outside radius R (that is, an outside radius of a working-fluid passage defined in the driving torus and driven torus) and a torus inside radius r (that is, an inside radius of a working-fluid passage defined in a stator disposed between the pump impeller and turbine runner) is set at a comparatively small value so as to reduce the axial size to radial size of the torque converter. More concretely, in the flattened torque converter disclosed in EP1099879, the ratio 2L/H of the sum 2L of the driving-torus axial length and the driven-torus axial length to the difference H (=R−r) between the torus outside radius R and the torus inside radius r is set to satisfy an inequality 0.55<2L/H<0.75. Additionally, a ratio r/R of the torus inside radius r to the torus outside radius R is set to satisfy an inequality 0.35<r/R<0.40. Furthermore, in the flattened torque converter disclosed in EP1099879, on the assumption that a point O on the central position of the working-fluid passage defined in the driving torus and driven torus and on a rotating shaft (a turbine shaft) is taken as origin, a line OX directed in the axial direction is taken as X-axis, and a line OY directed in the direction perpendicular to the axial direction is taken as Y-axis, the shape and dimensions of the working-fluid passage in the turbine (driven torus) are set or determined as follows. That is, the shape and dimensions of the working-fluid passage in the turbine (driven torus) are set or determined, so that a tangent point P between a 45°-inclined straight line C with respect to the X-axis and a curved line D contouring the outside curved surface of the working-fluid passage of the turbine (driven torus) is located within a specified area defined between first and second straight lines A and B. The first straight line A is represented by a predetermined linear equation Y=(R/L)·X+(6/4)·R, where R is the torus outside radius, L is the driving-torus axial length (or the driven-torus axial length), whereas the second straight line B is represented by a predetermined linear equation Y=(R/L)·X+(7/4)·R. In other words, EP1099879 merely teaches the reduction in a radius of curvature of the outer peripheral curved surface defining the outer peripheral working-fluid passage of the turbine (driven torus) so as to smooth internal working-fluid flow along the turbine outer peripheral curved surface of the reduced radius of curvature. This is advantageous with respect to reduced loss of fluid (suppressed turbulent flow) at the turbine inflow section, thus enhancing the torque absorbing capacity and power transmission capacity.

SUMMARY OF THE INVENTION

However, EP1099879 merely teaches the reduction in a radius of curvature of the outer peripheral curved surface defining the outer peripheral working-fluid passage of the turbine for the purpose of smooth internal working-fluid flow along the turbine outer peripheral curved surface by positioning the tangent point P between the 45°-inclined straight line C and the curved line D contouring the outside curved surface of the working-fluid passage of the turbine within the specified area defined between the first straight line A defined by Y=(R/L)·X+(6/4)·R) and the second straight line B defined by Y=(R/L)·X+(7/4)·R). EP1099879 fails to exactly define the interrelation between a radius of curvature of the outer peripheral curved surface defining the outer peripheral working-fluid passage of the turbine and a radius of curvature of the inner peripheral curved surface defining the inner peripheral working-fluid passage of the turbine. Additionally, EP1099879 teaches that in designing a working-fluid passage of the torque converter, usually, every cross section of the working-fluid passage is dimensioned to have the same cross-sectional area and thus dimensions of the inner peripheral curved surface defining the inner peripheral working-fluid passage of the turbine are determined by setting dimensions of the outer peripheral curved surface defining the outer peripheral working-fluid passage of the turbine. In the working-fluid passage design as disclosed in EP1099879, assuming that the previously-discussed ratio 2L/H is reduced in order to more greatly flatten the torque converter in the axial direction, there is a tendency for a radius of curvature of the inner peripheral curved surface defining the inner peripheral working-fluid passage of the turbine (or the pump impeller) to be reduced. This results in an increase in curvature loss (energy loss due to curvature) of working fluid at the outflow section of the pump impeller and at the inflow section of the turbine runner, thereby lowering a torque converter efficiency. In this case, the working fluid (working oil) tends to be broken away the turbine blade at the inner peripheral edged portion of the turbine blade or at the outer peripheral edged portion of the turbine core. As a result of this, an actual fluid-flow passage area tends to decrease, thus decreasing a flow rate of the working fluid and excessively reducing a torque capacity coefficient. This leads to the problem of undesirably lowered potential of the torque converter.

Accordingly, it is an object of the invention to provide a torque converter, capable of suppressing both an increase in curvature loss (energy loss due to curvature) of working fluid at an outflow section of a pump impeller and at an inflow section of a turbine runner and a reduction in torque capacity coefficient with the torque converter flattened.

In order to accomplish the aforementioned and other objects of the present invention, a torque converter comprises a converter cover to which a driving power is transmitted from a driving power source, a pump impeller formed integral with the converter cover, a turbine runner to which the driving power is transmitted through a working fluid from the pump impeller, the turbine runner having a turbine shell, a turbine core, and turbine blades disposed between the turbine shell and the core, a stator disposed between the pump impeller and the turbine runner, a flattening ratio L/D of a sum L of an axial length of the pump impeller and an axial length of the turbine runner to a torque-converter nominal diameter D of the torque converter being set to a value less than or equal to 0.21, and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined inequality $0.3 \leq r/R \leq 0.5$.

According to another aspect of the invention, a torque converter comprises a converter cover to which a driving power is transmitted from a driving power source, a pump impeller formed integral with the converter cover, a turbine runner to which the driving power is transmitted through a working fluid from the pump impeller, the turbine runner having a turbine shell, a turbine core, and turbine blades disposed between the turbine shell and the core, a stator disposed between the pump impeller and the turbine runner, a flattening ratio L/D of a sum L of an axial length of the pump impeller and an axial length of the turbine runner to a torque-converter nominal diameter D of the torque converter being set to a value less than or equal to 0.21, and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined condition that a torque converter efficiency obtained at the radius-of-curvature ratio r/R at which a torque capacity coefficient becomes a maximum torque capacity coefficient is set as a permissible lowest converter efficiency. The predetermined condition may be represented by an inequality A≦r/R≦B, where A is a lower limit of the radius-of-curvature ratio r/R, obtained when the converter efficiency reduces to the permissible lowest converter efficiency in accordance with a decrease in the radius-of-curvature ratio r/R from a peak point corresponding to a maximum converter efficiency, and B is an upper limit of the radius-of-curvature ratio r/R, obtained when the converter efficiency reduces to the permissible lowest converter efficiency in accordance with an increase in the radius-of-curvature ratio r/R from the peak point corresponding to the maximum converter efficiency. Preferably, the lower limit A is set to 0.3 and the upper limit B is set to 0.5, and the predetermined condition is represented by the inequality 0.3≦r/R≦0.5.

According to a further aspect of the invention, a torque converter comprises a converter cover to which a driving power is transmitted from a driving power source, a pump impeller formed integral with the converter cover, a turbine runner to which the driving power is transmitted through a working fluid from the pump impeller, the turbine runner having a turbine shell, a turbine core, and turbine blades disposed between the turbine shell and the core, a stator disposed between the pump impeller and the turbine runner, a flattening ratio L/D of a sum L of an axial length of the pump impeller and an axial length of the turbine runner to a torque-converter nominal diameter D of the torque converter being set to a value less than or equal to 0.21, and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined inequality 0.33≦r/R≦0.43.

According to a still further aspect of the invention, a torque converter comprises a converter cover to which a driving power is transmitted from a driving power source, a pump impeller formed integral with the converter cover, a turbine runner to which the driving power is transmitted through a working fluid from the pump impeller, the turbine runner having a turbine shell, a turbine core, and turbine blades disposed between the turbine shell and the core, a stator disposed between the pump impeller and the turbine runner, a flattening ratio L/D of a sum L of an axial length of the pump impeller and an axial length of the turbine runner to a torque-converter nominal diameter D of the torque converter being set to a value less than or equal to 0.21, and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined condition that a decrease rate of a torque converter efficiency with respect to a maximum converter efficiency is less than or equal to 1%. The predetermined condition may be represented by an inequality C≦r/R≦D, where C is a lower limit of the radius-of-curvature ratio r/R, obtained when a rate of change in the converter efficiency reduces to 1% in accordance with a decrease in the radius-of-curvature ratio r/R from a peak point corresponding to a maximum converter efficiency, and B is an upper limit of the radius-of-curvature ratio r/R, obtained when the rate of change in the converter efficiency reduces to 1% in accordance with an increase in the radius-of-curvature ratio r/R from the peak point corresponding to the maximum converter efficiency. More preferably, the lower limit C is set to 0.33 and the upper limit D is set to 0.43, and the predetermined condition is represented by the inequality 0.33≦r/R≦0.43.

According to a still further aspect of the invention, a torque converter comprises a converter cover to which a driving power is transmitted from a driving power source, a pump impeller formed integral with the converter cover, a turbine runner to which the driving power is transmitted through a working fluid from the pump impeller, the turbine runner having a turbine shell, a turbine core, and turbine blades disposed between the turbine shell and the core, a stator disposed between the pump impeller and the turbine runner, a flattening ratio L/D of a sum L of an axial length of the pump impeller and an axial length of the turbine runner to a torque-converter nominal diameter D of the torque converter being set to a value less than or equal to 0.21, and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined inequality E≦r/R≦F, where E is a lower limit of the radius-of-curvature ratio r/R corresponding to a maximum converter efficiency and F is an upper limit of the radius-of-curvature ratio r/R corresponding to a maximum torque capacity coefficient. Preferably, the lower limit E is set to 0.37 and the upper limit F is set to 0.5, and thus the ratio r/R is set to satisfy the predetermined inequality 0.37≦r/R≦0.5. The torque capacity coefficient may be represented by an equation $\tau = Ti/Ni^2$, where Ti is a magnitude of torque-converter input torque, and $Ni^2$ is a square of torque-converter input rotational speed.

The other objects and features of this invention will become understood from the following description with reference to the accompanying drawings.

DESCRIPTION OF THE PREFERRED EMBODIMENTS

Figure 1:
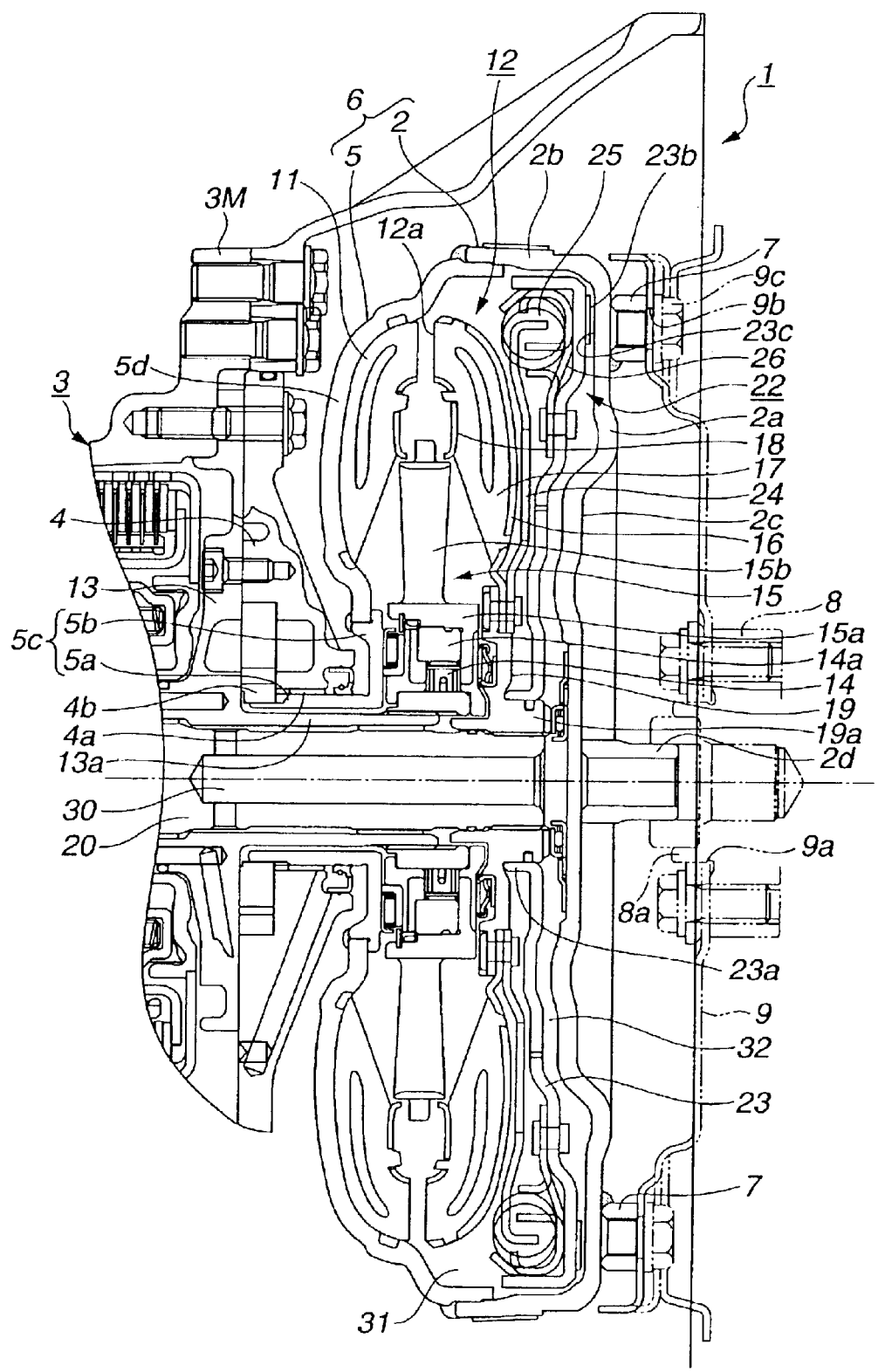
FIG. 1 is a longitudinal cross-sectional view illustrating a torque converter of the embodiment.
Figure 2:
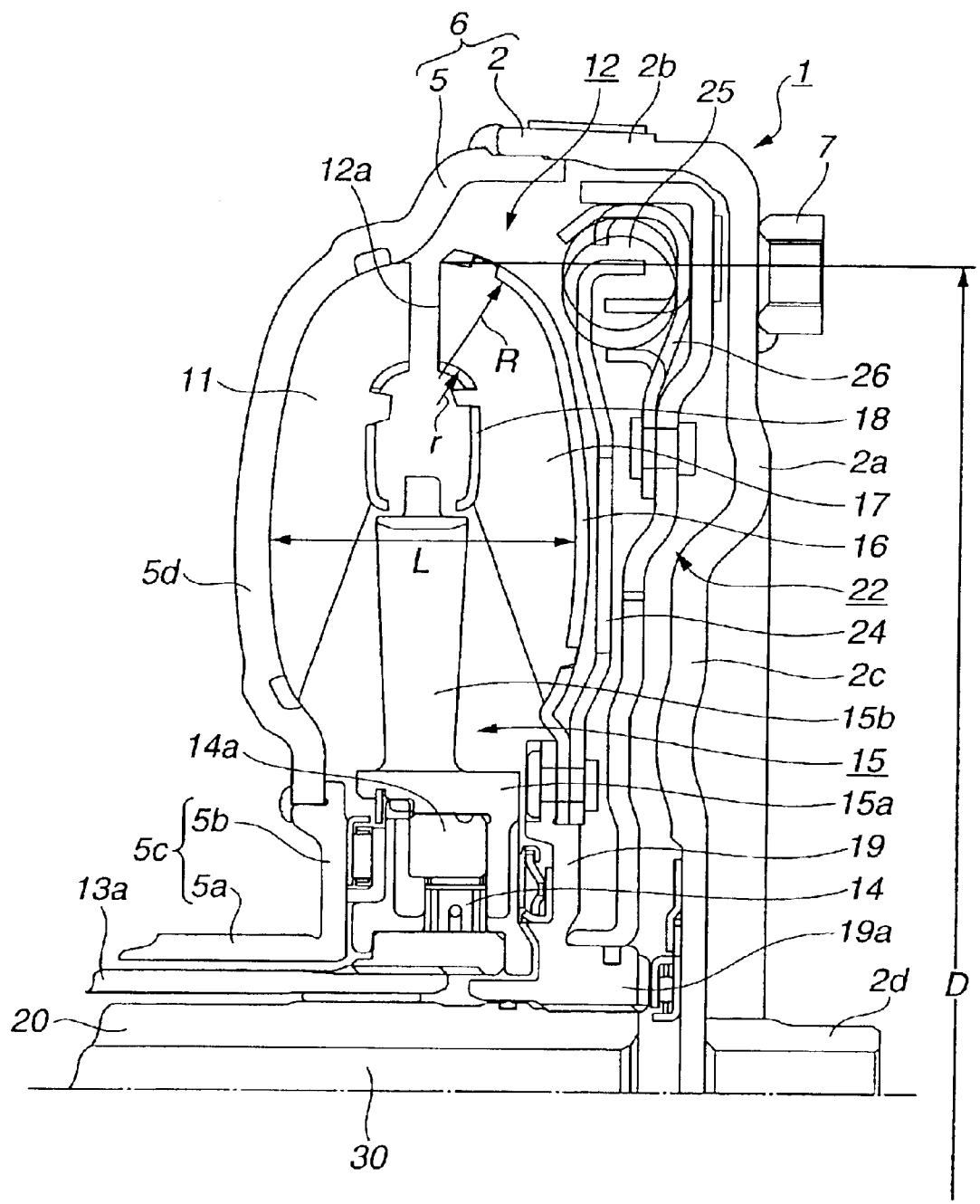
FIG. 2 is an enlarged cross-sectional view illustrating the essential part (in particular, a pump impeller and a turbine runner) of the torque converter of FIG. 1.

Referring now to the drawings, particularly to FIGS. 1 and 2, a torque converter 1 of the embodiment is exemplified in a lock-up clutch equipped torque converter. Torque converter 1 includes a converter cover 6 (a two-piece stamped metal shell) that is constructed by a front cover 2 and a rear cover 5 welded together. Front cover 2 is fixedly connected to a driving power source such as an internal combustion engine. Rear cover 5 is rotatably supported by an oil pump case 4 that is attached to the front-end face of a transmission case 3M of an automatic transmission 3. In FIG. 1, reference sign 3C denotes a converter housing. Front cover 2 is comprised of a forward disk-shaped portion 2a and a peripheral cylindrical portion 2b axially extending from the outer periphery of forward disk-shaped portion 2a. As clearly seen from the cross section of FIG. 1, forward disk-shaped portion 2a is formed with a central backwardly recessed portion 2c. An axially forward extending cylindrical hollow shaft portion 2d is formed at the center position of central backwardly recessed portion 2c. Circumferentially equidistant spaced, four weld nuts 7 are fixed onto the perimeter of forward disk-shaped portion 2a so as to connect the converter cover to the driving power source (the engine). In more detail, as can be appreciated from the two-dotted line in the cross section of FIG. 1, converter cover 6 is fixedly connected to an engine crankshaft 8 via a first drive plate 9 serving as a coupling member between the converter cover and engine crankshaft. First drive plate 9 is formed at its center with an insertion hole 9a into which an axially-protruding portion 8a of crankshaft 8 is fitted. Under a condition wherein axially-protruding portion 8a and insertion hole 9a are fitted to each other, the peripheral portion of first drive plate 9 close to insertion hole 9a is bolted to the rear end of crankshaft 8. First drive plate 9 is also formed with four mounting bolt holes 9b that are opposite to the respective weld nuts 7. First drive plate 9 is integrally connected to front cover 2 of converter cover 6 by securely screwing bolts 9c into the respective weld nuts 7. On the other hand, rear cover 5 is comprised of an inner member 5c having a L-shaped cross section and a torus-shaped outer member 5d. Inner and outer members 5c and 5d are welded together. Inner member 5c is constructed by an axially-extending cylindrical-hollow portion 5a and a radially-extending flanged portion 5b. Cylindrical-hollow portion 5a is rotatably supported by oil pump case 4. Flanged portion 5b is formed integral with cylindrical-hollow portion 5a in such a manner as to radially extend from the front end of cylindrical-hollow portion 5a. The inner periphery of torus-shaped outer member 5d is welded to the outer periphery of flanged portion 5b of L-shaped inner member 5c, whereas the outer periphery of torus-shaped outer member 5d is fitted to the inner peripheral wall surface of peripheral cylindrical portion 2b of front cover 2 and welded to the front cover by way of welding. Cylindrical-hollow portion 5a of L-shaped inner member 5c is rotatably supported on oil pump case 4 through a bushing 4a. The rear end portion of cylindrical hollow portion 5a of inner member 5c is connected to the inner periphery of an oil pump 4b that is accommodated in oil pump case 4, by way of spline connection. A plurality of impeller blades of a pump impeller 11 are attached to the inner peripheral wall surface of outer member 5d of rear cover 5. A plurality of turbine blades of a turbine runner 12 are provided in converter cover 6 so that the turbine blades 17 are opposite to the respective impeller blades of pump impeller 11. A stator 15 is located at the inner portion of torque converter 1 and disposed between pump impeller 11 and turbine runner 12. Stator 15 serves as a reactor that redirects working oil flow from turbine runner 12 to boost pump-impeller action and multiplies engine torque. Stator 15 is installed on a cylindrical hollow support portion 13a through a one-way clutch 14. Cylindrical hollow support portion 13a is formed integral with an oil pump cover 13 and constructs part of transmission case 3M. Oil pump cover 13 is fitted and bolted to the rear face of oil pump case 4 to hermetically cover the rear end of oil pump case 4. Stator 15 is comprised of a stator hub 15a and a plurality of stator blades 15b. Stator hub 15a is fixedly connected to an outer race 14a of one-way clutch 14. Stator blades 15b are attached onto the outer periphery of stator hub 15a.

Turbine runner 12 is comprised of a turbine shell 16, turbine blades 17, a turbine core 18 and a turbine hub 19. Turbine blades 17 are attached to the inner peripheral wall surface of turbine shell 16. Core 18 supports the rear ends of turbine blades 17. Turbine hub 19 supports the inner peripheral portion of turbine shell 16. A cylindrical portion 19a of turbine hub 19 is splined to a rotating shaft 20 (or an automatic transmission input shaft or a turbine shaft) that is rotatably supported by transmission case 3M. Nearby a turbine inflow section 12a of turbine runner 12, the outer peripheral portion of core 18 is configured and formed as an arcuate surface whose center lies on a prolongation of the end face of turbine blade 17 facing pump impeller 11. As hereinafter described in detail, torque converter 1 of the embodiment is formed as a flattened torque converter. As best seen in FIG. 2, assuming that a sum of an axial length of pump impeller 11 and an axial length of turbine runner 12 is denoted by L, and an outside diameter of pump impeller 11 and turbine runner 12 (hereinafter is referred to as a "nominal diameter of torque converter 1" is denoted by D, a ratio L/D of the sum L of the pump-impeller axial length and the turbine-runner axial length to the torque-converter nominal diameter D is set or determined to be less than or equal to 0.21 (that is, L/D≦0.21). The ratio L/D will be hereinafter referred to as a "flattening ratio". The smaller the flattening ratio L/D, the flatter the torque converter can become. Additionally, a radius-of-curvature ratio r/R of a radius of curvature r of a turbine inner peripheral curved surface at the turbine inflow section 12a (in other words, a radius of curvature r of a turbine-core outer peripheral curved surface at the turbine inflow section 12a) to a radius of curvature R of a turbine-shell outer peripheral curved surface at the turbine inflow section 12a is set to satisfy the following inequality (1).

$$0.3 \leq r/R \leq 0.5 \tag{1}$$

The radius-of-curvature ratio r/R of radius of curvature r of the turbine-core outer peripheral curved surface at turbine inflow section 12a to radius of curvature R of the turbine-shell outer peripheral curved surface at turbine inflow section 12a must be optimally set or determined for the following reasons. That is, the greater radius-of-curvature ratio r/R causes the curvature loss (the energy loss due to curvature) in the vicinity of turbine inflow section 12a to reduce. The reduced curvature loss contributes to enhanced converter efficiency. However, the greater radius-of-curvature ratio r/R leads to the problem of increased rate-of-change in working-fluid flow passage area in the fluid flow direction. Owing to the increased rate-of-change in working-fluid flow passage area, the converter efficiency is lowered. For the purpose of an optimised curvature loss/rate-of-change in working-fluid passage area trade-off, it is very important to optimize the radius-of-curvature ratio r/R. In addition to the above, the greater radius-of-curvature ratio r/R tends to reduce the amount of working fluid broken away from the turbine blade at the inner peripheral edged portion of turbine blade 17 or at the outer peripheral edged portion of turbine core 18. The reduced amount of working fluid broken away tends to increase a torque capacity coefficient τ. Torque capacity coefficient τ is proportional to the magnitude of input torque transmitted to the torque converter and inversely proportional to a square of input rotational speed of the torque converter. Thus, torque capacity coefficient τ is represented by the equation $\tau=Ti/Ni^2$, where Ti denotes the magnitude of torque-converter input torque, and $Ni^2$ denotes the square of torque-converter input rotational speed. On the other hand, the greater radius-of-curvature ratio r/R tends to narrow the fluid-flow passage. The narrowed fluid-flow passage tends to decrease torque capacity coefficient τ. For the purpose of an optimised breakaway of working fluid/working-fluid passage area trade-off, it is very important to optimize the radius-of-curvature ratio r/R.

Figure 3:
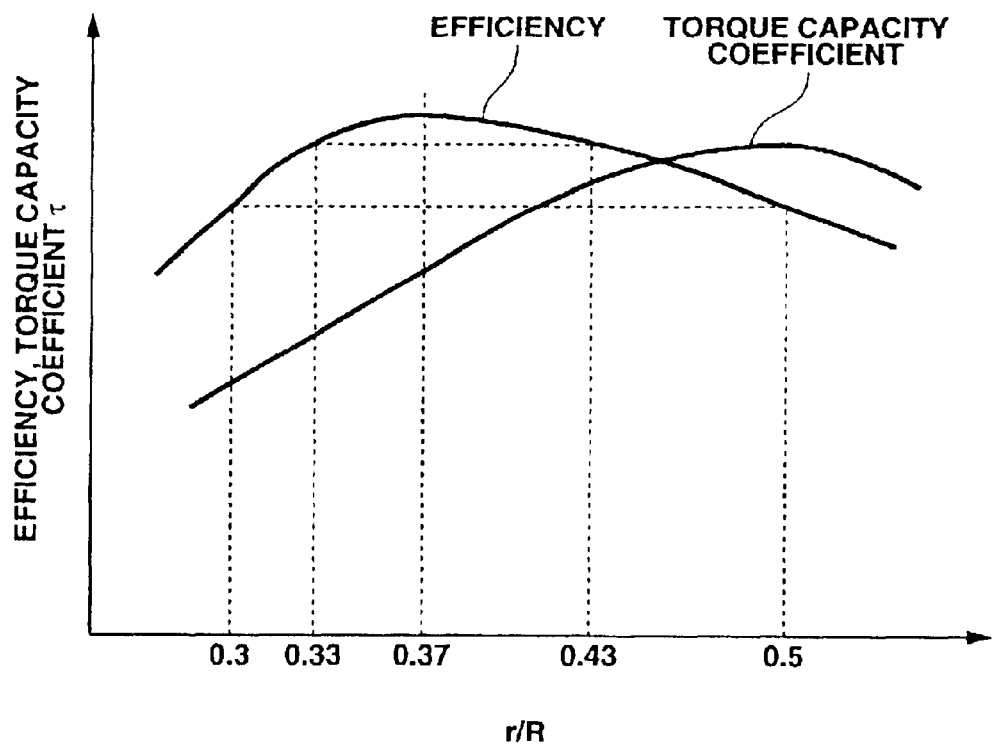
FIG. 3 shows two characteristic curves, namely a converter-efficiency versus radius-of-curvature ratio r/R characteristic and a torque capacity coefficient versus radius-of-curvature ratio r/R characteristic.
Figure 4:
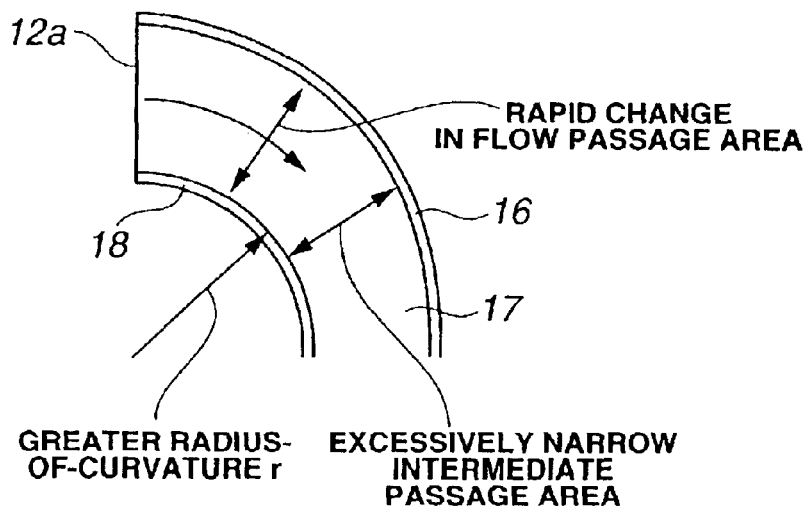
FIG. 4 is an explanatory view showing how the rate of change in fluid-flow passage area (in other words, the converter efficiency) is affected by the radius-of-curvature ratio r/R of a radius of curvature r of a turbine inner peripheral curved surface at the turbine inflow section (in other words, a radius of curvature r of a turbine-core outer peripheral curved surface at the turbine inflow section) to a radius of curvature R of a turbine-shell outer peripheral curved surface at the turbine inflow section.

Referring now to FIG. 3, there is shown the relationship among the radius-of-curvature ratio r/R, torque converter efficiency, and torque capacity coefficient τ. The characteristic curves (test results) shown in FIG. 3 are experimentally assured by the inventors of the present invention. As can be seen from the converter-efficiency versus radius-of-curvature ratio r/R characteristic curve of FIG. 3, the maximum converter efficiency is obtained at a point of r/R=0.37. The converter efficiency tends to reduce, as the radius-of-curvature ratio r/R gradually decreases from the peak point of r/R=0.37. Likewise, the converter efficiency tends to reduce, as the radius-of-curvature ratio r/R gradually increases from the peak point of r/R=0.37. On the other hand, as can be seen from the torque capacity coefficient τ versus radius-of-curvature ratio r/R characteristic curve of FIG. 3, the maximum torque capacity coefficient τ is obtained at a point of r/R=0.5. Torque capacity coefficient τ tends to reduce, as the radius-of-curvature ratio r/R gradually decreases from the peak point of r/R=0.5. Likewise, torque capacity coefficient τ tends to reduce, as the radius-of-curvature ratio r/R gradually increases from the peak point of r/R=0.5. As appreciated from the two characteristic curves of FIG. 3, when radius-of-curvature ratio r/R gradually increases from a certain value less than r/R=0.3, the converter efficiency and torque capacity coefficient τ both tend to increase. When the radius-of-curvature ratio r/R exceeds 0.37, there is a rapid change in working-fluid flow passage area in the fluid flow direction (see FIG. 4). Owing to the radius-of-curvature ratio r/R greater than 0.37, the rate of change in working-fluid flow passage area becomes excessively greater, thereby reducing the converter efficiency. When the radius-of-curvature ratio r/R further increases from 0.37 and reaches 0.5, torque capacity coefficient reaches the peak value. When the radius-of-curvature ratio r/R exceeds 0.5, torque capacity coefficient τ begins to decrease due to an excessively narrow intermediate passage area (see FIG. 4). In the flattened torque converter of the embodiment, a torque converter efficiency obtained at the radius-of-curvature ratio r/R=0.5 that torque capacity coefficient τ becomes its peak value is regarded and set as a permissible lowest converter efficiency. Therefore, taking into account usable converter efficiencies ranging from the maximum converter efficiency to the permissible lowest converter efficiency, the radius-of-curvature ratio r/R is set within a predetermined range defined by the inequality 0.3≦r/R≦0.5. When the converter efficiency has to take priority over the torque capacity coefficient τ, it is more preferable to set the radius-of-curvature ratio r/R at a value contained within a further narrow range defined by an inequality 0.33≦r/R≦0.43. In more detail, the narrow radius-of-curvature ratio range of 0.33≦r/R≦0.43 is determined or set such that a decrease rate of the converter efficiency with respect to the maximum converter efficiency (hereinafter is referred to as a "converter-efficiency peak-to-decrease rate") is less than or equal to 1%. More concretely, when the radius-of-curvature ratio r/R becomes less than 0.33 or greater than 0.43, the converter-efficiency peak-to-decrease rate exceeds 1%. In this manner, by way of optimal setting of radius-of-curvature ratio r/R, it is possible to balance the previously-discussed contradictory requirements, that is, reduced curvature loss, reasonable rate-of-change in working-fluid flow passage area, and reasonable breakaway of working fluid.

In the shown embodiment, a lock-up clutch 22 is disposed between front cover 2 and turbine runner 12 such that the torque converter (pump and turbine elements) is automatically locked up in predetermined gear ranges to eliminate internal slippage (energy loss) and improve fuel economy. Lock-up clutch 22 includes a lock-up piston 23. Lock-up piston 23 is comprised of an inside cylindrical portion 23*a* and an outside cylindrical portion. Inside cylindrical portion 23*a* of lock-up piston 23 is fitted onto (or splined to) the outer peripheral surface of cylindrical portion 19*a* of turbine hub 19, so that lock-up piston 23 is axially slidable relative to turbine hub 19 and that lock-up piston 23 rotates together with turbine hub 19. A lock-up facing 23*b* is attached to the front face of lock-up piston 23 and located at a position that lock-up facing 23*b* faces toward weld nuts 7 of front cover 2. The inner peripheral wall surface of front cover 2, facing to lock-up facing 23*b* is formed as a flat surface 23*c* perpendicular to the axis of rotating shaft 20 (automatic transmission input shaft). Lock-up clutch 22 also includes a flexible lock-up clutch hub 24 whose inside annular portion is fixedly connected to turbine hub 19 by way of riveting, for example. A second drive plate 26 is mechanically linked to the outside edged portion of clutch hub 24 via a damper spring 25. Second drive plate 26 is engaged with lock-up piston 23.

The flattened torque converter of the embodiment operates as follows. In a particular state wherein the vehicle is stopped and the engine is idling at an idle rpm, a lubricating oil, having a slightly higher pressure level than a pressure level of lubricating oil filling up a pump and turbine accommodating chamber 31, is supplied into a lubricating oil passage 30 bored in rotating shaft 20. Pump and turbine accommodating chamber 31 accommodates therein pump impeller 11 and turbine runner 12. Fluid pressure in the lubricating oil (or working oil) in pump and turbine accommodating chamber 31 is applied to the rear face of lock-up piston 23. Under the previously-noted particular state, the relatively higher-pressure lubricating oil in lubricating oil passage 30 is supplied into a lubricating oil chamber 32 defined between disk-shaped portion 2*a* of front cover 2 and the front face of lock-up piston 23. With the lapse of time, the lubricating oil supplied into lubricating oil chamber 32 flows through a flow-constriction orifice portion, which is defined between the outer periphery of lock-up piston 23 and the peripheral cylindrical portion 2*b* of front cover 2, towards pump and turbine accommodating chamber 31 opposite to lubricating oil chamber 32. As may be appreciated from the above, in the previously-noted particular state, lock-up facing 23b is held spaced apart from flat surface 23c of front cover 2 (see a slight space defined between the lock-up facing and the front-cover flat surface in FIG. 1), owing to the relatively higher lubricating oil pressure in lubricating oil chamber 32. This is called "lock-up clutch disengagement state". In the lock-up clutch disengagement state and in the particular state wherein the vehicle is stopped and the engine is idling at an idle rpm, driving power is transmitted through first drive plate 9 (the coupling member between the converter cover and engine crankshaft) and weld nuts 7 into front cover 2. Driving torque is then transmitted through rear cover 5 formed integral with front cover 2 into pump impeller 11. As a result, rotational motion of pump impeller 11 is converted into kinetic energy of lubricating oil (working oil) filling up pump and turbine accommodating chamber 31 of converter cover 6. In the previously-noted particular state, the rotating shaft 20 of automatic transmission 3 is held at its stopped state, and therefore the turbine is maintained at stall when turbine runner 12 is stopped and pump impeller 11 is turning as fast as the engine crankshaft will drive it. At this time, the torque transferred to converter cover 6 is transmitted through cylindrical-hollow portion 5a of inner member 5c of rear cover 5 into oil pump 4b of automatic transmission 3 to cause rotational motion of the oil pump. As set forth above, when the turbine of torque converter 1 is in stall with the engine at an idle rpm, the working oil (lubricating oil) in pump and turbine accommodating chamber 31 is pumped from the pump impeller blades across to turbine blades 17, then back to pump impeller 11 via stator blades 15b of stator 15 to provide oil circulation passage and to ensure torque transmission from the pump impeller to the turbine runner.

As will be appreciated from the above, in the flattened torque converter of the embodiment, the radius-of-curvature ratio r/R of radius of curvature r of the turbine-core outer peripheral curved surface at turbine inflow section 12a to radius of curvature R of the turbine-shell outer peripheral curved surface at turbine inflow section 12a is set to satisfy the inequality $0.3 \leq r/R \leq 0.5$. Thus, it is possible to enhance the converter efficiency, while effectively suppressing an increase in curvature loss that may occur owing to flattening of torque converter 1 in the axial direction. Additionally, it is possible to reduce the amount of working fluid broken away from the turbine blade at the inner peripheral edged portion of the turbine blade or at the outer peripheral edged portion of turbine core 18, thus enhancing torque capacity coefficient τ. This enhances a potential of the torque converter. When the converter efficiency has to take priority over the torque capacity coefficient τ, according to the torque converter of the embodiment, the radius-of-curvature ratio r/R is set to satisfy the inequality $0.33 \leq r/R \leq 0.43$. It is possible to design or provide a flatten torque converter having a higher converter efficiency while more effectively suppressing an increase in curvature loss of working fluid (energy loss due to curvature) by setting the radius-of-curvature ratio r/R within the predetermined range defined by inequality $0.33 \leq r/R \leq 0.43$. If the maximum converter efficiency has to be selected, the radius-of-curvature ratio r/R is set to 0.37 (see FIG. 3). When giving priority to torque capacity coefficient τ, it is preferable to set the radius-of-curvature ratio r/R within a predetermined range from r/R=0.37 (the maximum converter efficiency point) to r/R=0.5 (the maximum torque capacity coefficient point).

When switching from the vehicle's stopped state to the vehicle's starting state, rotating shaft 20 is shifted from its stopped state to its rotatable state. Thus, turbine runner 12 shifts from the stopped state to the rotating state and begins to rotate by way of the kinetic energy of lubricating oil obtained owing to rotation of pump impeller 11. In this manner, the turbine runner starts to rotate from the engine's idling state, and thus the vehicle also starts. After this, when the vehicle speed gradually increases and the turbine runner speed approaches the pump impeller speed and then a speed ratio e of turbine runner speed to pump impeller speed reaches approximately "1", the pressure level of lubricating oil in lubricating oil passage 30 is controlled to a relatively lower pressure level than that of pump and turbine accommodating chamber 31 responsively to a lock-up command signal from an electronic transmission control system (not shown) often abbreviated to "ECT". As a result of this, the lubricating oil in lubricating oil chamber 32 is returned into lubricating oil passage 30 bored in rotating shaft 20, and thus the pressure level of lubricating oil in lubricating oil chamber 32 becomes relatively lower than the pressure level of lubricating oil in pump and turbine accommodating chamber 31. This allows lock-up facing 23b of lock-up piston 23 to axially slide into contact with flat surface 23c of front cover 2 to cause a great frictional force between them. In this manner, torque converter 1 is automatically locked up by engaging lock-up clutch 22 in response to the lock-up command signal from the electronic transmission control system (not shown). Therefore, in the lock-up clutch engagement state, the driving torque transferred into front cover 2 of converter cover 6, is transmitted through lock-up piston 23, first drive plate 26, damper spring 25, clutch hub 24 and turbine hub 19 directly into rotating shaft 20.

In the shown embodiment, the outer peripheral portion of core 18 of turbine runner 12 nearby turbine inflow section 12a is configured and formed as an arcuate surface. The shape of core 18 is not limited to such an arcuate surface, and in lieu thereof the shape of core 18 may be configured and formed as an elliptical surface or a curved surface.

In the shown embodiment, the torque converter is exemplified in a so-called lock-up torque converter with lock-up clutch 22. The lock-up torque converter is conventional and forms no part of the present invention. Thus, lock-up clutch 22 may be omitted. Torque converter 1 of the embodiment is driven by a crankshaft of an internal combustion engine serving as a driving power source. The other driving power source, such as an electric motor or an electric motor/generator for use in an electric vehicle or a hybrid vehicle, may be used instead of the engine.

The entire contents of Japanese Patent Application No. P2001-303913 (filed Sep. 28, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A torque converter comprising:
    a converter cover to which a driving power is transmitted from a driving power source;
    a pump impeller formed integral with the converter cover;
    a turbine runner to which the driving power is transmitted through a working fluid from the pump impeller, the turbine runner having a turbine shell, a turbine core, and turbine blades disposed between the turbine shell and the core;
    a stator disposed between the pump impeller and the turbine runner;

a flattening ratio L/D of a sum L of an axial length of the pump impeller and an axial length of the turbine runner to a torque-converter nominal diameter D of the torque converter being set to a value less than or equal to 0.21 the torque-converter nominal diameter D being defined as an outside diameter of the pump impeller and the turbine runner; and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined inequality $0.3 \leq r/R \leq 0.5$.

2. A torque converter comprising:

a converter cover to which a driving power is transmitted from a driving power source;

a pump impeller formed integral with the converter cover;

a turbine runner to which the driving power is transmitted through a working fluid from the pump impeller, the turbine runner having a turbine shell, a turbine core, and turbine blades disposed between the turbine shell and the core;

a stator disposed between the pump impeller and the turbine runner;

a flattening ratio L/D of a sum L of an axial length of the pump impeller and an axial length of the turbine runner to a torque-converter nominal diameter D of the torque converter being set to a value less than or equal to 0.21 the torque-converter nominal diameter D being defined as an outside diameter of the pump impeller and the turbine runner; and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined condition that a torque converter efficiency obtained at the radius-of-curvature ratio r/R at which a torque capacity coefficient becomes a maximum torque capacity coefficient is set as a permissible lowest converter efficiency.

3. The torque converter as claimed in claim 2, wherein:

the predetermined condition is represented by an inequality $Ar/RB$, where A is a lower limit of the radius-of-curvature ratio r/R, obtained when the converter efficiency reduces to the permissible lowest converter efficiency in accordance with a decrease in the radius-of-curvature ratio r/R from a peak point corresponding to a maximum converter efficiency, and B is an upper limit of the radius-of-curvature ratio r/R, obtained when the converter efficiency reduces to the permissible lowest converter efficiency in accordance with an increase in the radius-of-curvature ratio r/R from the peak point corresponding to the maximum converter efficiency.

4. The torque converter as claimed in claim 3, wherein:

the lower limit A is set to 0.3 and the upper limit B is set to 0.5, and the predetermined condition is represented by the inequality $0.3 \leq r/R \leq 0.5$.

5. A torque converter comprising:

a converter cover to which a driving power is transmitted from a driving power source;

a pump impeller formed integral with the converter cover;

a turbine runner to which the driving power is transmitted through a working fluid from the pump impeller, the turbine runner having a turbine shell, a turbine core, and turbine blades disposed between the turbine shell and the core;

a stator disposed between the pump impeller and the turbine runner;

a flattening ratio L/D of a sum L of an axial length of the pump impeller and an axial length of the turbine runner to a torque-converter nominal diameter D of the torque converter being set to a value less than or equal to 0.21 the torque-converter nominal diameter D being defined as an outside diameter of the pump impeller and the turbine runner; and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined inequality $0.33 \leq r/R \leq 0.43$.

6. A torque converter comprising:

a converter cover to which a driving power is transmitted from a driving power source;

a pump impeller formed integral with the converter cover;

a turbine runner to which the driving power is transmitted through a working fluid from the pump impeller, the turbine runner having a turbine shell, a turbine core, and turbine blades disposed between the turbine shell and the core;

a stator disposed between the pump impeller and the turbine runner;

a flattening ratio L/D of a sum L of an axial length of the pump impeller and an axial length of the turbine runner to a torque-converter nominal diameter D of the torque converter being set to a value less than or equal to 0.21, the torque-converter nominal diameter D being defined as an outside diameter of the pump impeller and the turbine runner; and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined condition that a decrease rate of a torque converter efficiency with respect to a maximum converter efficiency is less than or equal to 1%.

7. The torque converter as claimed in claim 6, wherein:

the predetermined condition is represented by an inequality $C \leq r/R \leq D$, where C is a lower limit of the radius-of-curvature ratio r/R, obtained when a rate of change in the converter efficiency reduces to 1% in accordance with a decrease in the radius-of-curvature ratio r/R from a peak point corresponding to a maximum converter efficiency, and B is an upper limit of the radius-of-curvature ratio r/R, obtained when the rate of change in the converter efficiency reduces to 1% in accordance with an increase in the radius-of-curvature ratio r/R from the peak point corresponding to the maximum converter efficiency.

8. The torque converter as claimed in claim 7, wherein:

the lower limit C is set to 0.33 and the upper limit D is set to 0.43, and the predetermined condition is represented by the inequality $0.33 \leq r/R \leq 0.43$.

9. A torque converter comprising:

a converter cover to which a driving power is transmitted from a driving power source;

a pump impeller formed integral with the converter cover;

a turbine runner to which the driving power is transmitted through a working fluid from the pump impeller, the turbine runner having a turbine shell, a turbine core, and turbine blades disposed between the turbine shell and the core;

a stator disposed between the pump impeller and the turbine runner;

a flattening ratio L/D of a sum L of an axial length of the pump impeller and an axial length of the turbine runner to a torque-converter nominal diameter D of the torque converter being set to a value less than or equal to 0.21 the torque-converter nominal diameter D being defined as an outside diameter of the pump impeller and the turbine runner; and a ratio r/R of a radius of curvature r of a turbine-core outer peripheral curved surface of the core at a turbine inflow section to a radius of curvature R of a turbine-shell outer peripheral curved surface at the turbine inflow section being set to satisfy a predetermined inequality $E \leq r/R \leq F$, where E is a lower limit of the radius-of-curvature ratio r/R corresponding to a maximum converter efficiency and F is an upper limit of the radius-of-curvature ratio r/R corresponding to a maximum torque capacity coefficient.

10. The torque converter as claimed in claim 9, wherein:

the lower limit E is set to 0.37 and the upper limit F is set to 0.5, and thus the ratio r/R is set to satisfy the predetermined inequality $0.37 \leq r/R \leq 0.5$

* * * * *